United States Patent [19]

Belka

[11] Patent Number: 4,658,998
[45] Date of Patent: Apr. 21, 1987

[54] BICYCLE LUGGAGE CARRIER FRAME

[75] Inventor: Heinrich Belka, Bielefeld, Fed. Rep. of Germany

[73] Assignee: Esge Marby GmbH & Co., KG, Bielefeld, Fed. Rep. of Germany

[21] Appl. No.: 766,120

[22] Filed: Aug. 15, 1985

[30] Foreign Application Priority Data

Aug. 18, 1984 [DE] Fed. Rep. of Germany ....... 3430427

[51] Int. Cl.$^4$ ................................................ B62J 9/00
[52] U.S. Cl. ................................... 224/39; 224/30 R; 224/32 R
[58] Field of Search ...................... 224/30 R, 39, 33 R, 224/32 R, 32 A

[56] References Cited

U.S. PATENT DOCUMENTS

| | | | |
|---|---|---|---|
| 1,547,671 | 7/1925 | Mathews | 224/39 |
| 4,328,914 | 5/1982 | Michaud | 224/32 A X |
| 4,345,703 | 8/1982 | Allen | 224/32 A |
| 4,353,490 | 10/1982 | Jackson et al. | 224/32 A |
| 4,460,115 | 7/1984 | Jackson | 224/39 X |
| 4,480,773 | 11/1984 | Krauser | 224/32 A |
| 4,487,344 | 12/1984 | Blackburn et al. | 224/30 R X |

FOREIGN PATENT DOCUMENTS

613242 11/1948 United Kingdom ................... 224/39

Primary Examiner—Stephen Marcus
Assistant Examiner—Robert M. Petrik
Attorney, Agent, or Firm—Frishauf, Holtz, Goodman & Woodward

[57] ABSTRACT

A front wheel side luggage carrier (1) for bicycles comprises a strut arrangement (4) having two struts (7, 8), which when in the position of use extend substantially vertically and approximately parallel to a plane that intersects the front axle of the bicycle at right angles, and having an upper and a lower attachment arrangement (5, 6). Via these arrangements, the side luggage carrier (1) is secured to adjacent legs of the front wheel fork (2) at two points, one of which is located near the front axle and the other is spaced apart therefrom. In order to provide a simple structure, which even under adverse conditions will not tend to vibrate during the ride and which will be largely independent of the shape of the front wheel fork (2), the two vertical struts (7, 8) are joined integrally together at their lower end by means of a connecting cross portion (11), which bears the lower attachment arrangement (6). At their upper ends, the two vertical struts (7, 8) are bent toward one another, forming two transverse bent-over portions (23, 24) in alignment with one another, which in turn are bent at their free ends, forming two support struts (27, 28), towards the lower attachment arrangement (6) on which the support struts (27, 28) are anchored. The upper attachment arrangement (5) is provided on the support struts (27, 28).

24 Claims, 9 Drawing Figures

BICYCLE LUGGAGE CARRIER FRAME

The present invention relates to bicycle carriers and more particularly to a frame construction for front wheel carrier bags, for example made of plastic, nylon or the like, and adapted for attachment laterally of the front wheel to an axle attachment and the respective side of the front fork of the bicycle. Such carrier bags are also known as panniers.

BACKGROUND

Various types of side wheel luggage or similar carriers for bicycles have been proposed. Stiff wire baskets have the disadvantage that they project outwardly even if only partially loaded, are difficult to attach, and disturb the balance of the bicycle. Much more suitable, and in actual practice much easier to use are limp bags made of plastic, nylon or the like, secured to a frame typically of wire construction, the frame, in turn, being attached to the wheel fork of the bicycle. One attachment point, usually, is on, or adjacent the wheel axle, for example at an attachment point also provided to attach struts for mud guards or fenders; the other attachment, typically, is by means of a bracket clamped to the wheel fork of the bicycle.

Lateral front wheel luggage carrier frames of this type, as known, usually have a support strut arrangement, one for each side adjacent the front wheel of the bicycle, which is usually formed of a wire of circular cross section, commonly known as a round wire. The frame is bent into an equilateral trapeze. The free ends of the trapeze are welded together at the parallel smaller base thereof. The result will be two downwardly converging, essentially vertically extending struts or support elements which are connected by two horizontal connecting elements. One each of these frames is located at either side of the wheel.

The round wire forming the lower connecting element or cross portion is bent upward at the point of transition between the lower cross portion and the rear, vertically extending strut and follows this strut as far as about its middle. At this point, the second round wire is bent at at right angles toward the corner of the trapeze opposite this vertical strut, and from there the round wire follows along the upper cross portion. The result is that the rear vertical strut is reinforced by being additionally supported against the opposite corner.

This strut arrangement is attached at two points: first, on the transverse reinforcement strut in the vicinity of the front wheel axle, that is, in the area of the end portion of the fork, and second, on the rear end of the upper cross portion at the point where it extends past the associated leg of the front wheel fork of the bicycle. At this point, a securing screw passes through a corresponding bore in the transverse connecting portion, which is in alignment with an associated bore in the fork.

Securing the struts in this manner, however, dictates that the geometry of the side luggage carrier must be matched exactly to the shape of the front wheel fork, which as a rule means retrofitting of the luggage carrier is possible only in exceptional cases. If the shape of the fork and the shape of the side luggage carrier do not match, either it is impossible to secure the carrier, or else when the carrier is installed the upper cross portion will not extend horizontally, which means that the pocket, or pannier, secured to it will continually slip.

Furthermore, the known side luggage carrier is not sufficiently resistant to vibration or oscillation during the ride, because the upper and lower attachment points are in the immediate vicinity of the rear vertically extending strut, producing the effect of a correspondingly long lever arm for the front end of the side luggage carrier; this favors front end vibrations that are vertical to a plane that intersects the front axle at right angles. In the known side luggage carrier, an attempt is made to reduce this tendency toward vibrating by attaching the second round wire, which forms the transverse strut, to the inside of the fork.

This second wire, which must be matched exactly in contour to the wire that is bent into a trapeze, substantially increases the cost of manufacture, especially since, in order to fulfill its function, the second wire must be welded at many points to the round wire that is bent into the trapeze.

THE INVENTION

It is an object to provide a bicycle luggage carrier frame, particularly of the lateral bag or pannier type, for attachment to the wheel fork of a bicycle, which is sturdy, has a lesser tendency to vibrate or oscillate, is easier to manufacture and does not require specially manufactured parts to fit various types and manufactures of bicycles.

The frame construction is best described with reference to its attachment to the front fork of a bicycle, at one side thereof. A similar frame construction can be used at the other side.

When installed, a pair of approximately parallel struts—which, however, may converge somewhat, are formed at their lower end with a cross portion, unitary with the approximately vertical struts. An attachment arrangement, for example, an attachment block, is coupled to the cross portion to secure the cross portion to the bicycle on, or in the vicinity of, the front wheel axle. The approximately vertical parallel struts, at the upper ends, are formed with aligned bent-over portions facing each other, that is, being bent towards each other. The bent-over portions are then bent downwardly towards the attachment block, forming two essentially parallel vertical support struts which extend towards the lower attachment block. They are secured into the lower attachment block, for example, by a clamping arrangement which permits individual adjustment for easy matching of the frame structure to the front fork of any bicycle of any manufacturer, regardless of its curvature or shape. An upper attachment arrangement is provided, secured to the support struts in the region of the upper bent-over portions and/or to the support struts and/or to the vertically downwardly extending bent-over portions, respectively, preferably with an adjustable clamp or strap, the other end of the clamp or strap being connected to the front fork of the bicycle at a suitable height location.

The structure has the advantage that it can be connected to any type of bicycle, is sturdy, easy to make, and highly resistant against deflection or oscillation, for example, if the bicycle is ridden over a rough surface, such as a surface formed with paving stones or blocks, or a deformed surface with potholes.

Since the two vertical struts are joined integrally together by a cross portion at their lower end, no additional means is needed here to merely effect a mechanical connection between the vertical struts. Instead, by appropriately bending the vertical struts, support struts which substantially rigidify the side luggage carrier in the vertical direction and reduce its tendency to vibrating, can be furnished. A particularly favorable effect is attained if the upper attachment device is disposed in the vicinity of the bent-over portions. When the upper attachment device is shifted toward the middle, the moment of inertia is reduced with respect to the vertical axis of the side luggage carrier.

Securing the carrier becomes particularly simple if the lower attachment point has a bore, parallel to the front wheel axle, for receiving a securing screw, which can for instance be screwed into an extension of the end portion of the fork.

Still further improvement, in terms of lessening the tendency of the side luggage carrier to vibrate and increasing its stability, can be obtained if the cross portion is bent upward at the middle, towards the upper transverse or bent-over portions, forming two portions projecting upward, so that the cross portion and the vertical struts form a "W"; the lower attachment point is located at the highest point on the cross portion. This provision also makes for a lower center of gravity of the side baggage carrier. A low center of gravity of the side baggage carrier means a substantial improvement in terms of bicycle stability during the ride. Additionally, the two upwardly projecting portions can be joined together by a reinforcement strut at their ends remote from the lower attachment point.

Particularly favorable static and dynamic conditions for stability are obtained overall if the lower attachment point is located approximately between the middle and the lower third of the vertical extension of the side luggage carrier and is also located about in the middle between the vertical struts.

The free ends of the support struts are anchored in a way that readily compensates for flexion tolerances if the lower attachment point has an attachment block for the free ends adjacent to the lower attachment point of the support struts. Compensating for tolerances and mounting of the attachment block becomes quite simple if the free ends of the support struts adjacent to the lower attachment point extend parallel to one another, because two parallel bores can then be provided in the attachment block and the free ends can be secured, each in the correct position, in these bores; the position can be readily adjusted by suitably displacing the attachment block on the free ends. This is particularly important if the attachment block has a bore extending at right angles to the bores for the support struts and if this bore is in alignment with the bore in the cross portion, because then it is very simple to attach the side luggage carrier and no other changes need be made on the wheel fork of the bicycle.

There are various possible ways to anchor the free ends in the attachment block. One is that the bores for the support legs are not slitted and are each intersected by a cylindrical stepped bore extending at right angles to them. In the portion of the stepped bore having the larger diameter, there is a frustoconical clamping member having a coaxial threaded bore, into which a cap screw that extends through the portion having the smaller diameter can be screwed, so that the clamping member is pressed against the support strut. Another possibility is to provide the bores for the support struts with continuous longitudinal slits and to provide transverse bores with internal threads in the free ends of the support struts, extending at right angles to the longitudinal axes of the support struts. When installed, the transverse bores are each aligned with the longitudinal slit of the associated bore, and a clamping screw is inserted into the transverse bores, supported on the opposite wall of the associated longitudinally slit bore. Finally, it is also possible for the attachment block to be secured to the free ends of the support struts by means of a squeeze deformation connection; in this case, either the slitted or unslitted receiving bores for the support struts can be used. The slitted form has the advantage of a more favorable production cost because it can be made as an extruded profile, and also the bore for the securing screw can be made on the lower attachment point by punching.

If the attachment block is located between the fork and the cross portion when installed, then the projection of the support struts, the vertical struts and the cross portion forms a triangle, on a plane extending through the axle of the front wheel and the free ends of the support struts, which makes the strut arrangement considerably more rigid.

The rigidity of the side luggage carrier in the direction parallel to the upper bent-over portions is improved if the support struts, at their end adjacent to the bent-over portions, are joined to an upper attachment block which is rigidly secured to the support struts.

If the support struts are parallel to and spaced apart from one another over their entire length, then the upper attachment block can be formed similarly to the lower attachment block; that is, it has two continuous parallel receiving bores, and the support struts pass all the way through them; the attachment is preferably done by squeeze deformation.

A further increase in rigidity, while maintaining great flexibility in how the carrier is attached in the vicinity of the upper attachment point, is attained by forming the upper attachment block as a plate, secured at one end to the bent-over portions and at the other to a portion of the vertical support struts adjacent to the bent-over porrtions, preferably by welding. This plate then includes at least one oblong slot for receiving a securing screw. The oblong slot extends parallel to the upper bent-over portions.

Great rigidity is also attained, however, if the support legs, beginning at their free ends, diverge toward the upper bent-over portions and if the upper attachment block is formed as a reinforcement strut. This strut acts as the upper securing device which is adjustably engaged by a support strut secured at its other end to the fork. This provision, again, makes it easy to adapt the side luggage carrier to various wheel fork shapes. The simplest way to make the reinforcement strut adjustable is to provide an oblong slot, through which a securing screw passes, extending as far as a bore in the support member. The reinforcement strut and the oblong slot therefore suitably extend substantially parallel to the bent-over portions.

The side luggage carrier can be lightweight and corrosion resistant if the round wire that forms the struts connected integrally together is of aluminum.

DETAILED DESCRIPTION

Figure 1:
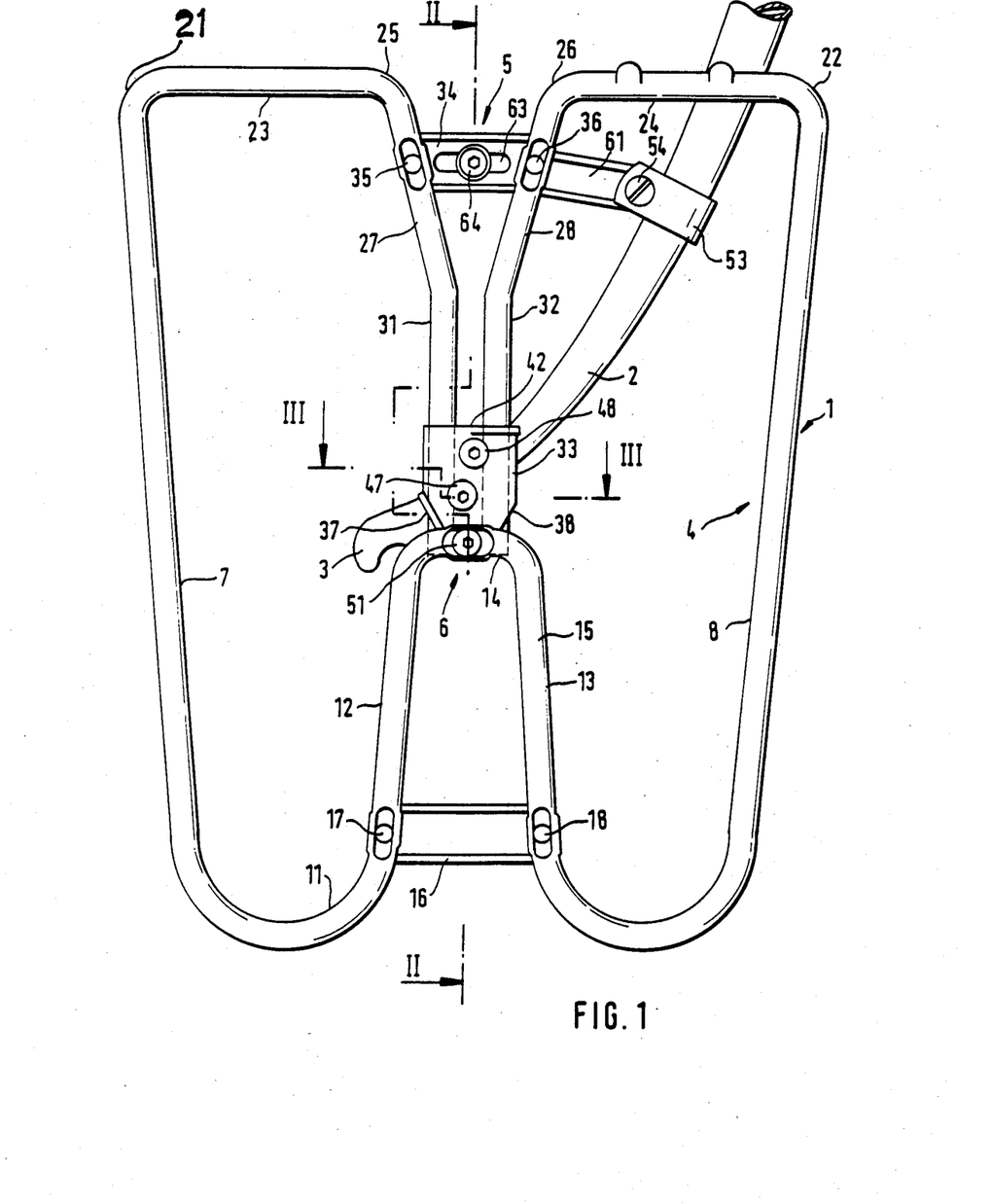
FIG. 1 shows a front wheel side luggage carrier for a bicycle, with a detail of the front wheel fork in a view from the left, in terms of the bicycle.
Figure 2:
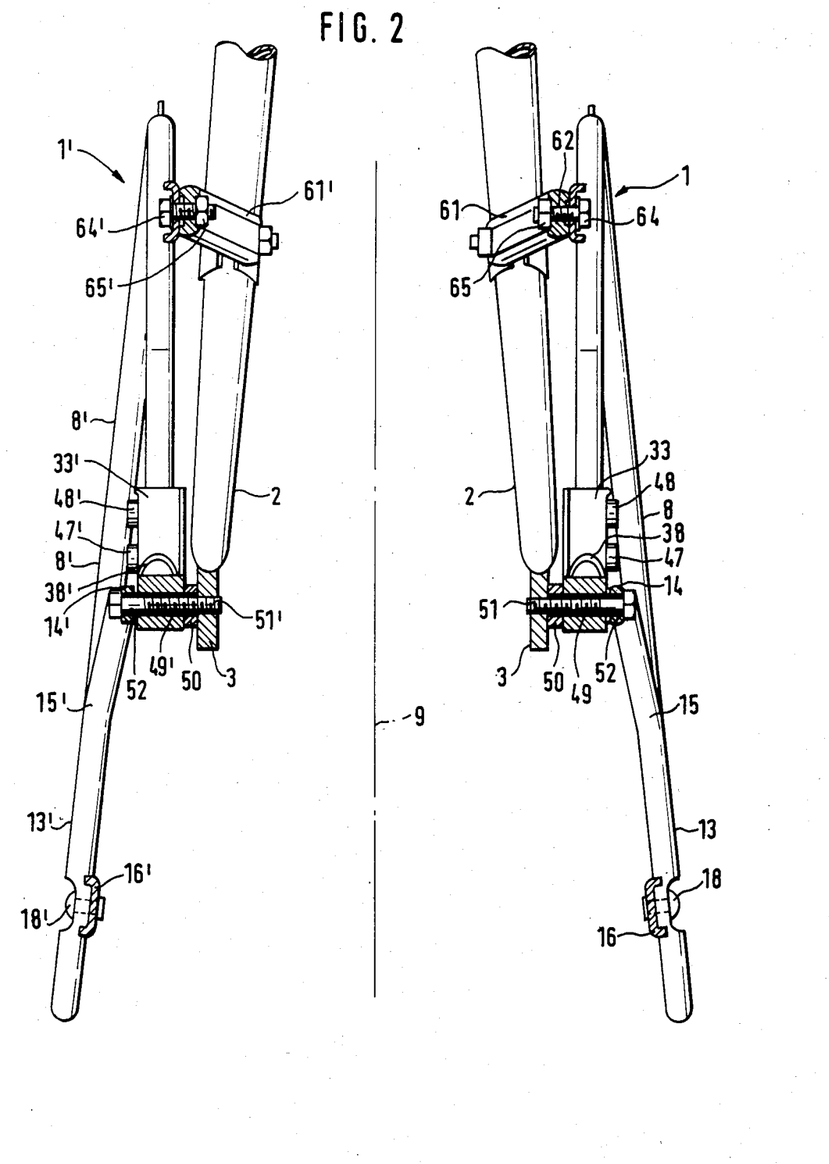
FIG. 2 is a front view of the front wheel side luggage carrier of FIG. 1, in a section taken along the line II—II of FIG. 1.

FIGS. 1 and 2 show a front wheel side luggage carrier 1, as it is secured to the lower end of a wheel fork 2 shown in detail and having an end portion 3. So as to locate the center of gravity as symmetrically as possible, there is a further side luggage carrier 1' (FIG. 2) on the right-hand side of the front wheel fork 2 shown; this carrier 1' is mirror-symmetrical with the carrier 1 but does not otherwise differ from it; hence the ensuing description is restricted to the side luggage carrier 1 and is understood to apply to the side luggage carrier 1' accordingly.

The side carrier 1 has a frame or strut arrangement 4, which is secured to an upper and lower attachment point 5, 6 on the front wheel fork 2 and includes two vertical struts 7 and 8 located in the same plane. This plane defined by the struts 7 and 8 extends approximately parallel to the associated end of the fork and hence approximately parallel to a plane 9, as shown in FIG. 2. The plane 9 is at least approximately the plane of rotation of the front wheel (not shown) of the bicycle. In FIG. 2, the components of the side carrier 1' corresponding to those of the side carrier 1 are identified with the same reference numerals but provided with a prime notation.

In their lower end, the two vertical straight struts 7 and 8, which in the exemplary embodiment shown converge slightly towards the bottom, are integrally joined to one another by means of a cross portion 11, producing two upwardly pointing portions 12 and 13, with the lower attachment point 6 being provided on the upper portion 14 of the cross portion 11. Overall, the vertical struts 7 and 8 and the cross portion 11, bent as shown, together form the approximate shape of a letter W, and as shown, the two straight vertical struts 7 and 8 merge with the upwardly pointing portions 12 and 13 of the cross portion 11 with a fairly large radius of curvature of approximately 2.5 cm. The upwardly pointing portions 12 and 13 extend straight, in terms of the projection shown in FIG. 1, and they converge slightly towards the lower attachment point 6. The upper third of the upwardly pointing portions 12 and 13 however, is bent out of the plane defined by the two vertical struts 7 and 8 in the direction of the front wheel fork 2, as shown particularly in FIG. 2. The lower area of the upwardly projecting portions 12 and 13, contrarily, is located in the same plane as the vertical struts 7 and 8.

To increase the strength of the cross portion or connecting strut 11, which is bent at several points, a reinforcement element 16 having a C-shaped profile is attached at the point where the cross portion 11 coming from the vertical struts 7 and 8 merges with the upwardly projecting portions 12 and 13, being riveted there to the upwardly projecting portions 12 and 13 by means of rivets 17 and 18.

On their lower end, the two vertical struts 7 and 8 are bent toward one another at 21 and 22, in such a manner that the two transverse bent-over portions 23 and 24, which are straight and are in alignment with one another, are formed, which in the position of use extend as exactly horizontally as possible. At 25 and 65, the two transverse struts 23 and 24 are also bent, but this time downward, forming two support struts 27 and 28, which coverge in the direction towards their free ends 31 and 32; the free ends 31 and 32 of the support struts 27 and 28 extend parallel to one another and are inserted into an attachment block 33 of the lower attachment point 6; this block 33 is formed as a clamping element.

At their upper end, the two support struts 27 and 28, which diverge upwardly beginning at their free ends 31 and 32, are joined together by another attachment block, in the form of a C-shaped reinforcement element 34. The reinforcement element 34 forms the upper attachment points 5 and is rigidly joined to the support legs by means of rivets 35 and 36.

As shown, with the exception of the two reinforcement elements 16 and 34, the strut arrangement 4 of the side luggage carrier 1 is produced by bending a suitable semifinished material. The semifinished material is preferably a round wire or a round tube having a diameter between 5 and 15 mm, depending on the strength desired, and a corrosion-resistant metal such as an aluminum alloy or high-grade steel is used. Steel or the like can also be used.

The attachment block 33 is an approximately cube-shaped body with beveled corners at 37 and 38 at its lower narrow end. Parallel to its longest extension, the attachment block 33 includes two unslitted through bores, parallel to one another, for receiving the free ends 31 and 32 of the two support struts 27 and 28. The unslitted through bores 39 and 41 begin at the top 42 of the clamping element 33 and emerge at the bottom, passing through the oblique faces 37 and 38.

Figure 3:
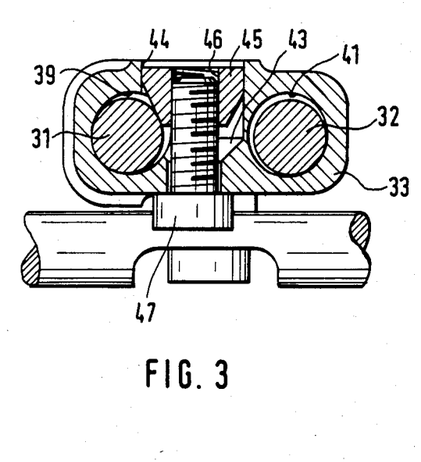
FIG. 3 is a plan view of the clamping element for the side luggage carrier of FIG. 1, seen in a section taken along the line III—III of FIG. 1.

For clamping the free strug 31, a cylindrical stepped bore 48 is provided in the attachment block 33, extending at right angles to the through bore 49. With its portion 44 having the larger diameter, the stepped bore 43 intersects the through bore 39, and for clamping the free leg 31 firmly, a frustoconical clamping member 45 having a coaxial threaded bore 46, as shown in FIG. 3, is mounted in this portion 44. An Allen head screw 47 is inserted into the threaded bore 46, passing through the portion of the stepped bore 43 having the smaller diameter and with its head abutting the outside of the attachment block 33. As soon as the Allen head screw 47 is tightened, the frustoconical clamping member 45 presses the free leg 31 against the opposite inner wall of the through bore 39, which is thereby held firmly. For clamping the free end 32 of the support strut 28, a further stepped bore, corresponding to the stepped bore 43, is provided in the attachment block 33; however, this bore intersects the through bore 41, and a correspondingly frustoconical element which is tightened by means of an Allen head screw 48 is located in the through bore 41.

Below the two Allen head screws 47 and 48, a further cylindrical bore 49 is provided in the attachment block 33 (see FIG. 2); this bore 49 again extends at right angles to the two through bore 39 and 41 and serves to receive a securing screw 51, which is inserted into a corresponding threaded bore of the end portion 3 of the fork 2 in order to attach the side luggage carrier. A through bore 52 which is located in the portion 14 of the cross portion 11 is in alignment with the cylindrical through bore 49 in the attachment block 33.

Therefore, by means of the securing screw 51, both the cross portion 11 and the two free ends 31 and 32 of the support struts 27 and 28 are secured to the lower attachment point 6, with the aid of the attachment block 33. This lower attachment point 6 is located in the middle between the two vertically extending struts 7 and 8, and also approximately in the middle in terms of the height of the side luggage carrier 1. Since the two support struts 27 and 28, as FIG. 2 shows, are bent out of the plane of the two vertical struts 7 and 8 in accordance with the angle of the upwardly projecting portions 12 and 13 and in accordance with the thickness of the attachment block 33, the result is an approximately triangular projection, which has an increased rigidity.

Assembly

To assemble the side luggage carrier 1, first the attachment block 33 is pushed far enough onto the two free ends 31 and 32 of the strut arrangement 4, which by this time has been bent into final form and riveted to the reinforcement elements 16 and 34, that the bore 49 of the attachment block 33 is in alignment with the bore 52. In this position, the two Allen head screws 47 and 48 are tightened, causing the free ends 31 and 32 to be firmly clamped in the attachment block 33 by means of the clamping members 45. With the screw 1, the side luggage carrier 1 is now screwed to the end portion 3 of the fork 2; as appropriate, a spacer 50 can be inserted between the attachment block 33 and the end portion 3, as shown, if the shape of the fork 2 requires it. Thus the side luggage carrier 1 is now anchored to the fork 2 at its lower attachment point 6.

To anchor it to the upper attachment point 5, a suitable strap clamp 53 (see FIG. 1) is mounted on the fork 2, and a support strut 61 is attached to the clamp 53 by means of a screw 54. In its forward end the support strut 51 has an oblong slot 62, which is aligned by pivoting the support strut 61 and by shifting the strap clamp 53 such that the oblong slot 62 is sufficiently well aligned with an oblong slot 63 of the upper reinforcement element 34 that a further securing screw 64 can be pushed through the two oblong slots 62 and 63 aligned with each other. The securing screw 64 is tightened by means of a lock nut 65. The side luggage carrier 1 is now firmly connected to the bicycle fork 2 at its upper attachment point 5 as well, and the bent-over portions 23 and 24 extend exactly horizontally.

The central location of the lower attachment point 6, with respect to the outside dimensions of the side luggage carrier 1, results in particularly short lever ratios, which effectively suppress vibration and oscillation of the side luggage carrier 1. Furthermore, the abutment point for the two ends of the otherwise uncut strut arrangement 4 is also located in this area, resulting in favorable force ratios at the abutment point. Additionally, manufacturing tolerances arising during the bending operations are readily compensated for by shifting the attachment block 33.

Finally, because the two support struts 27 and 28 begin in the middle of the side luggage carrier 1 and lead directly to the lower attachment point 6, where the upwardly extended portion of the cross portion 11 is attached as well, vertical vibration is avoided, even if the road surface is extremely uneven, as is the case with paving stones. Rotational vibration is suppressed by the upper attachment point 5, which is located spaced apart from the lower attachment point 6.

Figure 4:
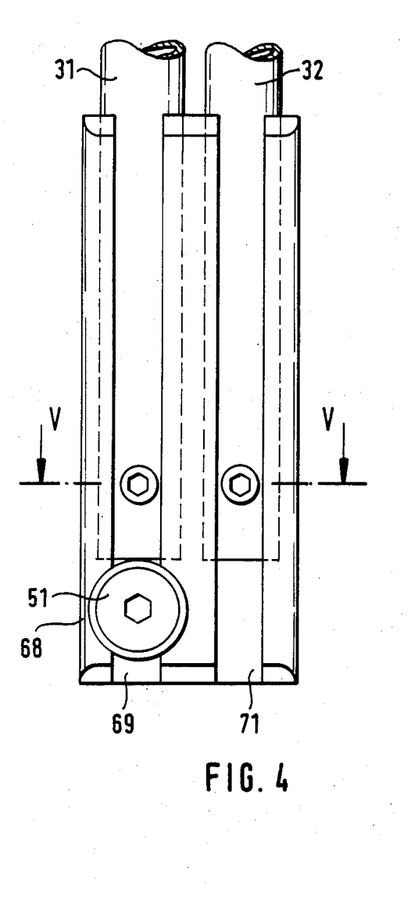
FIG. 4 shows a further exemplary embodiment of the clamping element for the side luggage carrier of FIG. 1, with longitudinally slit bores.
Figure 5:
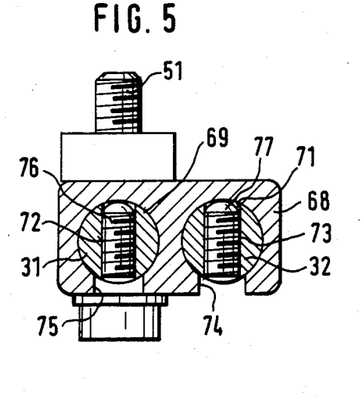
FIG. 5 is a plan view of the clamping element of FIG. 4, in a section taken along the line V—V of FIG. 4.

Alternatively to the attachment block shown in FIGS. 1-3, the attachment block 68 shown in FIGS. 4 and 5 can be used, which again has an approximately cube-shaped body and includes two slitted through bores 69 and 71 extending parallel to its longitudinal extension. The free ends 31 and 32 of the support struts 27 and 28 are inserted into these two longitudinally slit through bores 69 and 71. To fix the free ends 31 and 32 firmly in the clamping block 68, both free ends 31 and 32 have threaded bores 72 and 73 in the vicinity of their portion that is inserted into the clamping block 68; these bores 72 and 73 extend at right angles to the longitudinal axis of the free ends 31 and 32 and are in alignment with the slits 74 and 75 produced by longitudinally slitting the two bores 69 and 71. Set screws with Allen heads are inserted into the threaded bores 72 and 73, and the length of these screws corresponds approximatly to the diameter of the free ends 31 and 32.

To screw the attachment block 68 into place, a through bore, which is not visible in the drawing figures, is provided which extends at right angles to the bore 69 and is in alignment with the associated longitudinal slit 75; the securing screw 51 is inserted into this bore.

The attachment block 68 is mounted in such a way that after the set screws 76 and 77 have been screwed into the free ends 31 and 32 of the support struts 27 and 28, they are introduced into the through bores 69 and 71. Then the clamping block 68 is displaced longitudinally until the bore for the securing screw 51 is in alignment with the bore 52 in the portion 14. Then the two set screws 72 and 73 are tightened against the inner wall of the through bores 69 and 71, that is, the wall opposite the two longitudinal slits 74 and 75, using a tool that can be introduced through the longitudinal slits 74 and 75 into the Allen head of the set screws 76 and 77.

The advantage of this clamping block 68 is that it is easily fabricated by cutting off sections of a corresponding extruded profile.

Figure 6:
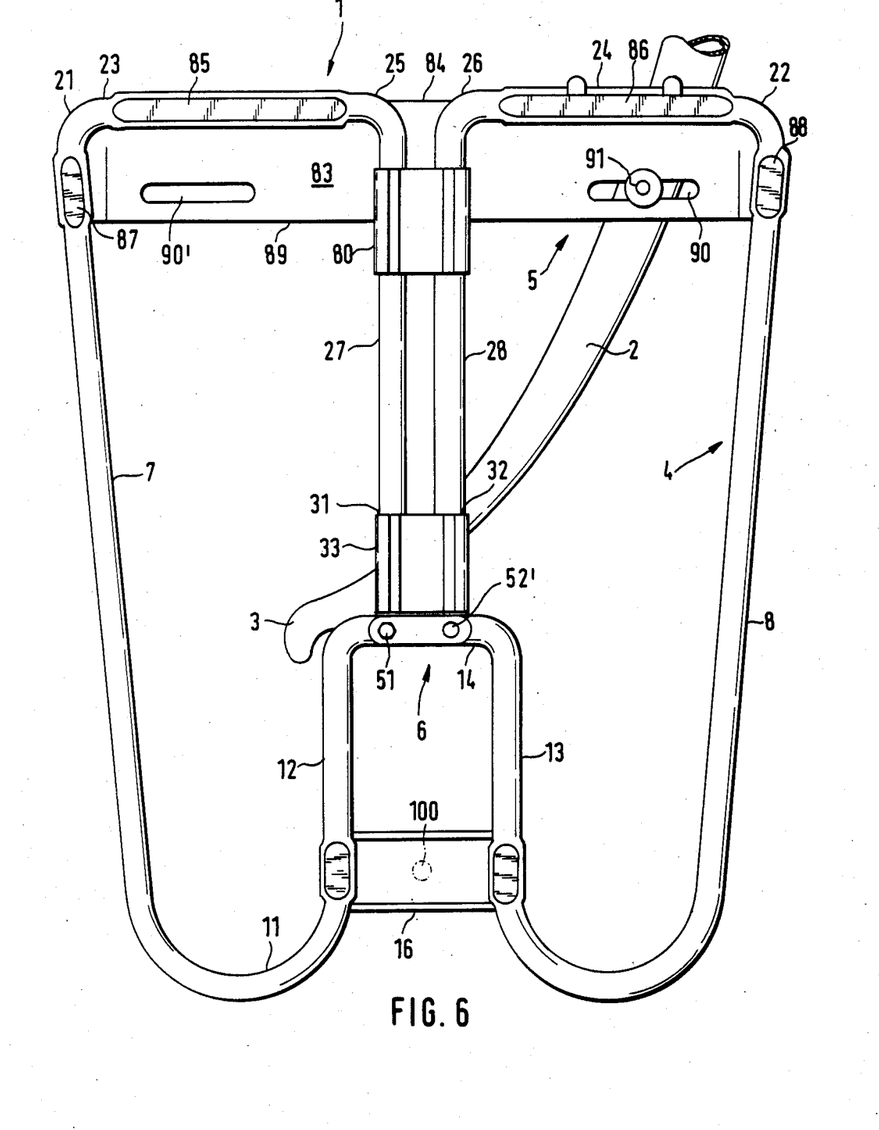
FIG. 6 shows a further exemplary embodiment of a front wheel side luggage carrier for a bicycle according to the invention, with a detail of the front wheel fork in a view from the left, in terms of the bicycle.
Figure 7:
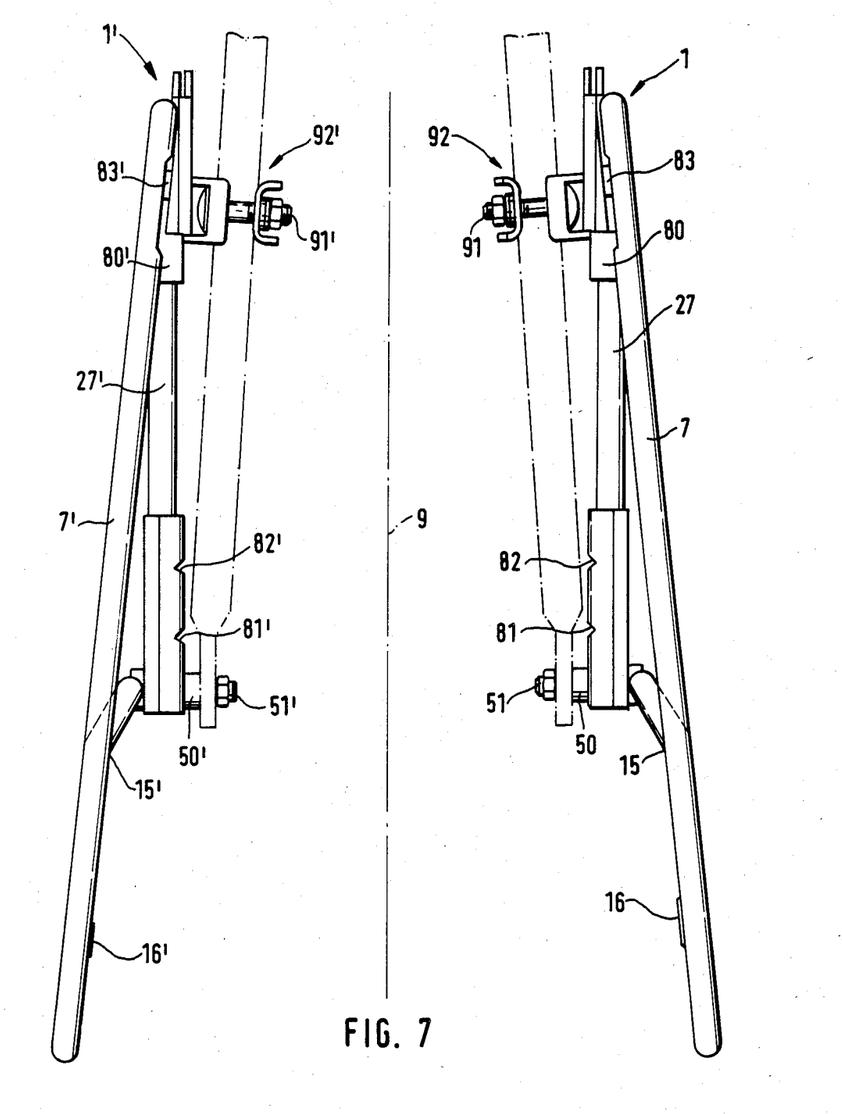
FIG. 7 is a front view of the front wheel side luggage carrier of FIG. 6.
Figure 8:
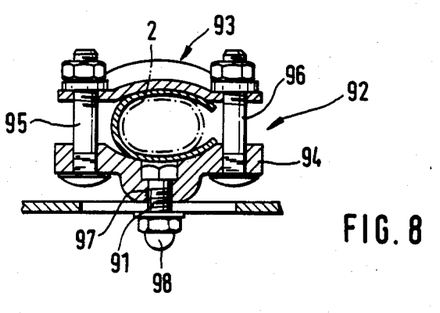
FIG. 8 shows a strap clamp for the upper securing device of the side luggage carrier of FIG. 6.

In FIGS. 6-8, a further exemplary embodiment of the front wheel side luggage carrier 1 is shown, which differs from the foregoing exemplary embodiment substantially in terms of the upper attachment point 5. Structural parts which are also present in this exemplary embodiment are provided with the same reference numerals and therefore will not be described in detail again.

In FIG. 6, again, the strut arrangement comprises a suitable round wire and is bent into a "W"; however, the upwardly projecting portions 12 and 13 of the cross portion 11 extend substantially parallel to one another and the reinforcement strut 16 is attached not by riveting but by welding, in a unitary bond. The lower attachment point 6 is not shifted as far, with respect to the vertical extension, toward the geometrical middle of the side luggage carrier 1 and is located approximately between the middle and the lower third of the side luggage carrier 1.

Furthermore, the support struts 27 and 28 extend parallel to and spaced apart from one another over their entire vertical extension, and therefore the bending points 25 and 26, at which the two upper cross portions 23 and 24 are bent to form the support struts 27 and 28, are located correspondingly close together. In this manner, instead of the connecting element 34, an attachment block 80, can be used, which has the same cross section as the attachment block of FIG. 5. The attachment block 80 accordingly includes two parallel longitudinally slit bores 69 and 71 spaced apart from one another, though which the parallel support struts 27 and 28 extend. The attachment block 80 is rigidly secured to the support struts 27 and 28 by means of a squeeze deformation connection; that is, the attachment block 80 is squeezed onto the support struts 27 and 28 at the proper location and retained there by the resultant deformation.

Alternatively, the attachment block 80 can be realized with unslitted through bores 69 and 71, yet the squeeze deformation connection can still be utilized. The slitted embodiment has the advantage that the extruded profile from which the attachment block 80 is cut off can be fabricated at a somewhat more favorable cost.

The lower attachment block 33, contrarily, has the same form as that explained above, which is shown in FIGS. 4 and 5 in connection with the exemplary embodiment of FIG. 1. The attachment block 33 is again rigidly secured to the support struts 27, 28 via a squeeze deformation connection, and because of this the lower ends of the support struts 27, 28 need not have any internal threads 72, 73 with set screws 76, 77. The squeeze deformation is effected at the time of manufacture, when the transverse bore provided in the attachment block 33 for the securing screw 51 is in alignment with the bore 52 in the portion 14 of the cross portion 11.

The squeeze deformation may be effected for instance by stamping in two notches 81 and 82.

If the longitudinally slit embodiment shown in FIGS. 4 and 5 is selected for the attachment blocks 33 and 80 and if these attachment blocks are squeeze deformed, as described, then it is advantageous if the side walls extending parallel to the through bores 69 and 71 converge somewhat in the direction of the longitudinal slits 74 and 75. Then a mating piece can be used during squeeze deformation, which during that process effectively prevents the longitudinal slits 75 and 74 from widening yet without the risk that the deformed attachment blcok 33, 80 will become jammed in the tool.

The upper attachment point 5 includes a strip-shaped or elongated plate 83, which is provided on the side of the strut arrangement adjacent to the fork 2. The elongated plate 83, which extends from the vertical strut 7 to the vertical strut 8, is joined at its upper edge 84 to the bent-over portions 23 and 24 by spot-welding. The edges on the narrow sides of the plate 83 are also secured in a unitary manner, by means of further spot-welded portions, to the portions of the two vertically extending struts 7 and 8 adjacent the bent-over portions 23 and 24. To facilitate the spot-welding, the bent-over cross portions 23 and 24 and the struts 7 and 8 are appropriately flattened in the appropriate areas at 85, 86, 87 and 88.

Beside its lower edge 89, the plate 83 includes an oblong slot 90, which extends parallel to the bent-over portion 24 and beside the strut 8. The oblong slot 90 serves to receive a securing screw 91 for a strap clamp 92, shown in cross section in FIG. 8. To enable easy use of the side luggage carrier 1 on the other side of the bicycle as well, a further oblong slot 90', corresponding in its location to the oblong slot 90, is located beside the strut 7; for the same reason, a further securing opening 52' can also be provided in the portion 14 of the cross portion 11, and a corresponding bore can be provided in the attachment block 33.

Depending on the thickness of the attachment block 80 and its location on the support struts 27 and 28, the plate 83 is deep drawn, at least in the area of the attachment block 80, so that it can extend behind the attachment block 80 without tension.

In accordance with a modified embodiment, it is also possible to use the plate 83 directly as an attachment block for the two support struts 27 and 28; in that case the plate 83 is welded to the support struts 27 and 28 in the area where it overlaps them, for instance by spot-welding as described with respect to the vertically extending struts 7 and 8. In order to increase the strength here, a reinforcing crimp, extending parallel to the bent-over portions 23, 24 can be made in the plate 83.

The strap clamp 92 comprises two approximately dish-shaped parts 93 and 94, which are approximately matched in shape to the cross section of the fork 2 and are clamped together by means of two stove bolts 95 and 96, which extend through corresponding bores. Between the two stove bolts 95 and 96 in the clamp part 94, there is a further bore 97, in which the securing screw 91 is located, and a hexagonal recess on the inside of the clamp part 94 prevents the hexagonal screw 91 from turning when its lock nut 98 is screwed on and tightened during assembly.

Figure 9:
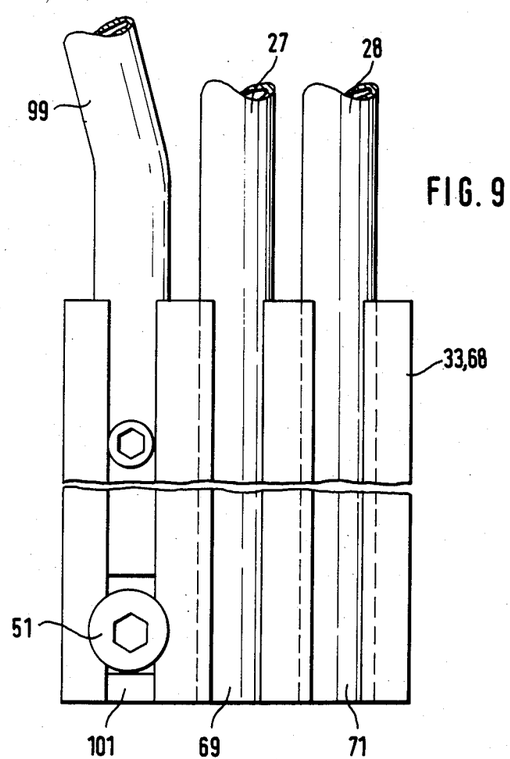
FIG. 9 shows the lower attachment block of the front wheel side luggage carrier of FIG. 1 or 6, having an additional receiving bore for the support strut of a front wheel luggage carrier.

If a front wheel luggage carrier is to be mounted in addition to the above-described side luggage carrier, then it is appropriate if the attachment block 33 or 68 includes a further through bore 101, extending parallel to the bores 69, 71 or 89, 41, for receiving a corresponding luggage carrier strut 99, as shown in FIG. 9. The securing screw 51 here leads through a corresponding bore extending at right angles to the receiving bore 101. The support strut 99 of the front wheel luggage carrier is clamped in the same way as described for the support struts 27 and 28 in conjunction with FIGS. 4 and 5.

It will be understood that in all the exemplary embodiments, the upwardly projecting portions 12 and 13 of the cross portion 11 will never project outward, with respect to the longitudinal axis of the bicycle, from the plane defined by the vertical struts; otherwise, the luggage would lift away from the struts 7 and 8.

In order to improve the stability of the contact of the luggage with the vertical struts 7 and 8, the plane defined by these two struts 7 and 8 preferably extends at a slight angle of approximately 6° from the vertical when the bicycle is upright. The luggage secured on the side luggage carrier 1 is thus pressed with a small force component against the vertical struts 7 and 8, because their lower end is located slightly farther from the middle of the bicycle than are the two bent-over portions 23 and 24.

This inclination is generally adequately assured by the provision that the ends of the fork 2 do not extend parallel. If the obliquity of the ends of the fork 2 should not be sufficient, then the inclination of the side luggage carrier 1 can be adjusted by means of the selected thickness of the attachment block 33 or of the spacer 50.

If the side luggage carrier 1 is attached to the front wheel fork at the securing openings which receive the support struts for the fender, the opportunity arises of providing a corresponding bore 100, which serves to retain the support struts of the front fender, in the reinforcement strut 16.

I claim:

1. Bicycle luggage carrier frame, particularly lateral pannier-type frame, for lateral attachment to a front wheel fork of a bicycle which, upon attachment to the front wheel fork, extends laterally and effectively vertically parallel to the front wheel of a bicycle, comprising
 a pair of approximately vertical, spaced struts (7,8) located in a plane essentially parallel to the plane of rotation of the front wheel of the bicycle;
 a cross portion (11) unitary with each of the approximately vertical struts (7, 8) extending from a bottom portion of the struts towards each other;
 and upwardly extending projecting portion (12, 13) unitary with each of the cross portions, and extending upwardly between said approximately vertical struts (7,8);
 a lower attachment arrangement (6) secured to the upwardly extending portions (12, 13) and attaching said upwardly extending portions together, said attachment arrangement being adapted for attachment at the lower end of the front wheel fork (3) of the bicycle,
 whereby said generally vertical struts, said cross portions (11), said upwardly extending portions (12,13) and said attachment arrangement form an essentially W-shaped frame,
 the lower attachment arrangement (6) being located adjacent the highest point (14) of the upwardly extending portions (12, 13);
  bent-over essentially horizontal portions (23, 24) unitary with said approximately vertical struts joined to upper portions of the approximately vertical struts (7,8) and extending towards each other;
  an upper attachment arrangement (5) secured to the upper portions of the struts (7,8) in the region of said essentially horizontal bent-over portions (23,24) for attachment to an upper portion of the wheel fork (2) of the bicycle;
 and downwardly directed support strut portions (27,28) unitary with said essential horizontal bent-over portions (23,24), each downwardly directed support strut portion being bent downwardly from the respective essentially horizontal bent-over portion (23, 24) and terminating in a free end, said free ends extending towards the lower attachment arrangement (6) and being secured thereto.

2. Bicycle carrier frame according to claim 1, wherein the lower attachment arrangement (6) is formed with a bore (52) parallel to the axle of the wheel for reception of an attachment bolt (51) connecting said lower attachment arrangement (6) to the attachment of the lower end of the front fork (2).

3. The bicycle carrier frame of claim 1 including a reinforcement element (16) connecting the two upwardly extending portions (12, 13) at end regions remote from the lower attachment arrangement.

4. Bicycle carrier frame according to claim 1, wherein the lower attachment arrangement (6) is located approximately between the middle and the lower third of the vertical dimension of the carrier frame (1).

5. Bicycle carrier frame according to claim 1, wherein the lower attachment arrangement (6) is located in midway between the vertical struts (7, 8).

6. Bicycle carrier frame accoding to claim 1, wherein the lower attachment arrangement (6) has an attachment block (33,66) for retaining the free ends (31, 32) of the downwardly extending strut portions (27, 28).

7. Bicycle carrier frame according to claim 6, wherein the free ends (31, 32) of the dowwardly extending strut portions (27, 28) adjacent the lower attachment arrangement (6) extend spaced apart from and parallel to one another, and wherein the attachment block (33, 68) includes two bores (39, 41, 69, 71) parallel to and spaced apart from one another, in which said free ends (31, 32) are secured.

8. Bicycle carrier of claim 7, wherein the attachment block (33, 68) is formed with a cylindrical stepped bore (43) extending at right angles to the bores (39, 41) for the downwardly extending strut portions (27, 28);
 and the clamping member (45) having a coaxial threaded bore (46) is located in the portion (44) of the stepped bore;
 a cap screw (47) extending through the portion having the smaller diameter, pressing the clamping member (45) against the downwardly extending strut portions (27, 28) adjacent their free ends (31, 32).

9. Bicycle carrier frame according to claim 7, wherein the bores (69, 71) for the support struts (27, 28) are longitudinally slit and the free ends (31, 32) of the downwardly extending strut portions (27,28) include transverse bores (72, 73) having an internal thread which extend at right angles to the longitudinal axes of the downwardly extending strut portions (27, 28), the transverse bores (72, 73) being in alignment with the longitudinal slit (74,75) of the associated bore (69, 71) and a clamping screw (76, 77) abutting against opposite inner wall of the bore (69, 71) and being screwed into the transverse bores (72, 73).

10. Bicycle carrier frame according to claim 7, wherein the attachment block (33, 68) is undetachably and rigidly secured to the free ends of the downwardly extending strut portions (27, 28)

11. The bicycle carrier frame of claim 10 wherein the attachment block (33,68) and downwardly extending strut portions (27, 28) are secured by a squeeze deformation connection (81, 82).

12. Bicycle carrier frame according to claim 1 wherein the lower attachment arrangement (6) is formed with a bore (52) parallel to the axle of the wheel for reception of an attachment bolt (51) connecting said lower attachment arrangement (6) to the attachment of the lower end of the front fork (2),
 and wherein the attachment block (33, 68) has a cross bore (49) extending at right angles to the bores (39, 41, 69, 71) for the support struts (27, 28), said cross bore (49) being in alignment with the bore (52, 52') in the cross portion (11).

13. Bicycle carrier frame according to claim 6, wherein the attachment block (33, 68), in the installed position, is located between the fork (2) and the cross portion (11).

14. The bicycle carrier of claim 1 including an upper attachment element (34, 80, 83) connecting together and being secured to the downwardly extending strut portions (27, 28) adjacent the bent-over essentially horizontal portions (23, 24).

15. Bicycle carrier frame according to claim 14, wherein the downwardly extending strut portions (27, 28) extend parallel to and spaced apart from one another over their entire length;

and the upper attachment element (80) includes two continuous parallel receiving bores, through which said downwardly extending strut portions (27, 28) extend the attachment element (80) being undetachably secured to the said downwardly extending strut portions (27, 28).

16. Bicycle carrier frame according to claim 1 wherein the upper attachment arrangement (5) includes a plate (83), which is secured, to the essentially horizontal bent-over portions (23, 24) on one end and to a portion of the vertically extending struts (7, 8) adjacent the essential horizontal bent-over portions (23, 24) on the other, and includes at least one oblong slot (90, 90') for receiving a securing screw (91).

17. Bicycle carrier frame according to claim 16, wherein the plate (83) forms part of an upper attachment member.

18. Bicycle carrier frame according to claim 16, wherein the essentially horizontal oblong slot (90, 90') extends parallel to the bent-over portions (23, 24).

19. The bicycle carrier frame of claim 1 wherein the downwardly directed support strut portions (27, 28), beginning at their free ends (31, 32) diverged towards the essentially horizontal bent-over portions (23, 24);

and the upper attachment arrangement comprises
a reinforcing element (34) and a support strut (61) secured to the fork (2) and adjustably retaining said reinforcement element thereon.

20. Bicycle carrier frame according to claim 19 wherein the reinforcement element (34) includes an oblong slot (63), and a securing screw (64) extending through a bore (52) of the support strut.

21. Bicycle carrier frame according to claim 20, wherein the reinforcement element (34) and the oblong slot (63) extend substantially parallel to the essentially horizontal bent-over portions (23, 24).

22. The bicycle carrier frame of claim 1 wherein said struts (7, 8);

the cross portions unitary with each of the struts;
the outwardly extending projecting portions (12, 13) unitary with each of the cross portions;
said bent-over essentially horizontal portions (23, 24) and said downwardly directed support strut portions (27, 28) comprise a unitary wire element, bent to include and define said portions.

23. The bicycle carrier frame of claim 22 wherein said wire element comprises a round wire of aluminum alloy.

24. The bicycle carrier frame of claim 22, wherein the lower attachment arrangement (6) is formed with a bore (52) parallel to the axle of the wheel for reception of an attachment bolt (51) connecting said lower attachment arrangement (6) to the attachment of the lower end of the front fork (2);

wherein the lower attachment arrangement (6) has an attachment block (33, 66) for retaining the free ends (31, 32) of the downwardly extending strut portions (27, 28);
including an upper attachment element (34, 80,83) connecting together and being secured to the downwardly extending strut portions (27, 28) adjacent the bent-over essentially horizontal portions (23, 24).

* * * * *